United States Patent
Aoki et al.

(10) Patent No.: US 9,150,694 B2
(45) Date of Patent: Oct. 6, 2015

(54) COMPOSITION FOR USE IN OPTICAL MATERIAL WITH HIGH REFRACTIVE INDEX AND HIGH STRENGTH

(75) Inventors: Takashi Aoki, Osaka Prefecture (JP); Hirohito Ishizuka, Chiba Prefecture (JP); Motoharu Takeuchi, Chiba Prefecture (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 13/319,857

(22) PCT Filed: May 10, 2010

(86) PCT No.: PCT/JP2010/057909
§ 371 (c)(1),
(2), (4) Date: Feb. 27, 2012

(87) PCT Pub. No.: WO2010/131631
PCT Pub. Date: Nov. 18, 2010

(65) Prior Publication Data
US 2012/0142889 A1    Jun. 7, 2012

(30) Foreign Application Priority Data
May 14, 2009 (JP) .................................. 2009-117568

(51) Int. Cl.
  *C08G 75/02* (2006.01)
  *C08G 75/04* (2006.01)
  *C08G 75/08* (2006.01)
  *C08L 81/02* (2006.01)
  *G02B 1/04* (2006.01)

(52) U.S. Cl.
  CPC .................. *C08G 75/08* (2013.01); *C08L 81/02* (2013.01); *G02B 1/041* (2013.01); *G02B 1/043* (2013.01)

(58) Field of Classification Search
  None
  See application file for complete search history.

(56) References Cited

U.S. PATENT DOCUMENTS

| 2004/0254258 A1 | 12/2004 | Horikoshi et al. |
| 2009/0018308 A1 | 1/2009 | Kamura et al. |
| 2010/0004421 A1* | 1/2010 | Horikoshi et al. ............. 528/59 |
| 2010/0331515 A1 | 12/2010 | Takeuchi et al. |

FOREIGN PATENT DOCUMENTS

| JP | 9-110979 | 4/1997 |
| JP | 2001-2783 | 1/2001 |
| JP | 2004-137481 | 5/2004 |
| JP | 2005-281527 | 10/2005 |
| JP | 2006-348285 | 12/2006 |
| JP | 2007-93862 | 4/2007 |
| JP | 2007-093862 | 4/2007 |
| JP | 2007-238796 | 9/2007 |
| JP | 2008-101190 | 5/2008 |
| WO | WO 2008/035643 A1 * | 3/2008 |
| WO | 2008/136401 | 11/2008 |
| WO | 2010/073613 | 7/2010 |

OTHER PUBLICATIONS

Search report from International Application No. PCT/JP2010/057909, mail date is Jul. 27, 2010.
Japan Office action, mail date is Jul. 1, 2014.

* cited by examiner

*Primary Examiner* — Susannah Chung
*Assistant Examiner* — Robert T Butcher
(74) *Attorney, Agent, or Firm* — Greenblum & Bernstein, P.L.C.

(57) ABSTRACT

A composition for use in an optical material is disclosed which is capable of providing an optical material satisfying a high refractive index (ne is 1.73 or more), a high strength (an elongation is 10% or more in a three-point bending test and drilling resistance is good), and a high thermostability (a softening point measured by TMA is 70° C. or higher). The optical material such as a lens for two-point frame spectacles is formed by polymerizing and curing a composition for use in an optical resin material containing (a) an inorganic compound having a sulfur atom and/or a selenium atom, (b) an episulfide compound, and (c) a xylylenedithiol compound.

9 Claims, No Drawings

COMPOSITION FOR USE IN OPTICAL MATERIAL WITH HIGH REFRACTIVE INDEX AND HIGH STRENGTH

TECHNICAL FIELD

The present invention relates to a composition for use in an optical material, furthermore, to an optical material or an optical resin material such as a plastic lens, a prism, an optical fiber, an information recording base material and the like using the same. The optical material of the present invention is suitably used for a plastic lens, in particular, a lens for two-point frame spectacles.

BACKGROUND ART

Since plastic materials are light in weight, excellent in toughness and are easily dyeable, they have been used heavily for various kinds of optical materials, in particular, a lens for spectacles in recent years. Examples of performances required for optical materials, in particular, for an optical material for a spectacle lens include a low specific gravity as physical properties, a low degree of yellowness as chemical and thermal properties, high heat resistance and a high strength as mechanical properties, and examples of optical performances required include high transparency, a high refractive index and a high Abbe's number. Whereas the high refractive index enables the lens thickness to be thin-walled and the high Abbe's number reduces the lens chromatic aberration, the higher the refractive index becomes, the lower the Abbe's number becomes. Therefore, studies for improving the two together had been carried out. Among the studies, a method of using an episulfide compound shown in Patent Document 1 was provided as a major method. As another example, in addition, an optical material having the refractive index of 1.73 or higher by means of using an optical material comprising a polyepisulfide compound shown in Patent Documents 2 and 3 was proposed.

On the other hand, for a lens whose thickness has been reduced accompanied by upgrading the refractive index, a high strength is required more than ever before from the viewpoint of safety and the like. For example, in order to apply a frame, so-called a two-point frame, it is necessary to bore a hole in a lens with a drill and at this time, it is required to have enough strength not to generate cracks and/or breaks. Moreover, in order to withstand for the use of a two-point frame, the lens is required to have enough strength not to be broken even if the frame is bending. At the same time, since it is standard that the plastic lens is hard-coated for protecting its surface and heat is applied at the time of hard coating, heat resistance is also required.

Because of this background, studies for satisfying all of a high refractive index, a high strength and heat resistance at once had been carried out so far. Among the studies, a method of using a xylylenedithiol compound shown in Patent Document 4 was provided as a major method. According to this study, both of a high strength and high heat resistance were achieved for the material having the refractive index of 1.70, whereas, for the material having the refractive index of 1.73 or higher, any materials having both of a high strength and high heat resistance could not be obtained.

Therefore, regarding the lens having a refractive index of 1.73 or higher using an episulfide compound, it is expected to develop a lens highly excellent in strength and in heat resistance.

PRIOR ART DOCUMENTS

Patent Document

Patent Document 1: Jpn. Pat. No. 3491660
Patent Document 2: Jpn. Pat. No. 3738817
Patent Document 3: Jpn. Pat. No. 4127169
Patent Document 4: Jpn. Pat. Laid-Open Publication No. 2008-101190

DISCLOSURE OF THE INVENTION

Problems to be Solved by the Invention

The problem to be solved by the present invention is to provide a composition for use in an optical material capable of providing an optical material satisfying a high refractive index (ne is 1.73 or more), a high strength (an elongation is 10% or more in an three-point bending test and drilling resistance is good), and high heat resistance (a softening point measured by TMA is 70° C. or higher) at the same time.

Means for Solving the Problems

As a result of the intensive studies to solve the above problems, under the circumstances, the present inventors have solved the above problems, and thus completed the present invention. That is, the present invention is as follows:
[1] A composition for use in an optical material comprising:
(a) 1-50 parts by weight of an inorganic compound having sulfur atom(s) and/or selenium atom(s),
(b) 50-99 parts by weight of at least one of episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide, and
(c) 1-50 parts by weight of a xylylenedithiol compound based upon 100 parts by weight of the total content of the above compounds (a) and (b).
[2] The composition for use in an optical material according to [1], wherein said inorganic compound (a) is sulfur.
[3] The composition for use in an optical material according to [1], wherein said episulfide compound (b) is bis(β-epithiopropyl)sulfide and/or bis(β-epithiopropyl)disulfide.
[4] The composition for use in an optical material according to [1], wherein said xylylenedithiol compound (c) is m-xylylenedithiol and/or p-xylylenedithiol.
[5] The composition for use in an optical material according to [1], wherein the content of said inorganic compound (a) is 10% by weight or more based upon the total content of said composition for use in an optical material.
[6] The composition for use in an optical material according to [1], which does not comprise 1% by weight or more of a xylylenediisocyanate compound.
[7] The composition for use in an optical material according to [1], wherein at least a part of said inorganic compound (a) and said episulfide compound (b) are contained as a prepolymerization reactant obtained by prepolymerization reaction with each other.
[8] A process for preparing a composition for use in an optical material which comprises a process of mixing the following compounds (a), (b) and (c):
(a) 1-50 parts by weight, which is to be 10% by weight or more based upon the total content of said composition for use in an optical material, of an inorganic compound having a sulfur atom and/or a selenium atom, (b) 50-99 parts by weight of at least one of episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide, and (c) 1-50 parts by weight of a xylylenedithiol compound based upon 100 parts by weight of the total content of the above compounds (a) and (b).

[9] The process for preparing a composition for use in an optical material according to [8], which further comprises a process of prepolymerization reaction of at least a part of said inorganic compound (a) with said episulfide compound (b) with each other.

[10] A process for producing an optical material which comprises the following processes (A) and (B):

(A) a process of preparing a composition for use in an optical material by mixing the following compounds (a), (b) and (c):

(a) 1-50 parts by weight, which is to be 10% by weight or more based upon the total content of said composition for use in an optical material, of an inorganic compound having a sulfur atom and/or a selenium atom, (b) 50-99 parts by weight of at least one of episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide, and (c) 1-50 parts by weight of a xylylenedithiol compound based upon 100 parts by weight of the total content of the above compounds (a) and (b).

(B) a process of polymerizing and curing said composition for use in an optical material.

[11] The process for producing an optical material according to [10], wherein said process (A) further comprises a process of prepolymerization reaction of at least apart of said inorganic compound (a) and said episulfide compound (b) with each other.

[12] An optical material obtained by a process for producing according to [10] or [11], which has a refractive index (ne) of 1.73 or more.

[13] A lens for two-point frame spectacles composed of the optical material according to [12].

Effect of the Invention

The present invention provides a composition for use in an optical material capable of providing an optical material satisfying a high refractive index (ne is 1.73 or more), a high strength (an elongation is 10% or more in an three-point bending test and drilling resistance is good), and an excellent performance in heat resistance, an optical material obtained by curing said composition and a lens for two-point frame spectacles using the same.

BEST MODE FOR CARRYING OUT THE INVENTION

1. Composition for Use in Optical Material

The composition for use in an optical material of the present invention comprises (a) an inorganic compound having a sulfur atom and/or a selenium atom (hereinafter, "compound (a)"), (b) an episulfide compound (hereinafter, "compound (b)") and (c) a xylylenedithiol compound (hereinafter, "compound (c)"), and if necessary, optional ingredients such as a polymerization catalyst, a polymerization regulator, a performance improver or the like.

(1) Compound (a)

The compound (a) to be used for the present invention, which is an inorganic compound having a sulfur atom and/or a selenium atom include all the inorganic compounds having at least one sulfur atom and/or selenium atom. It is preferable that the content rate of the total weight of sulfur atoms and/or selenium atoms based upon the compound (a) is at least 30% by weight. When the content rate is less than 30% by weight, since the increasing rate of the content of the weight of sulfur atoms and/or selenium atoms in the composition for use in an optical material is small, the effect of improvement of a refractive index of the resin may become small. The content of the compound (a) is 1-50 parts by weight, preferably 5-50 parts by weight, more preferably 10-40 parts by weight, most preferably 10-30 parts by weight based upon 100 parts by weight of the total weight of the compounds (a) and (b).

Examples of the inorganic compounds having sulfur atom(s) include sulfur, hydrogen sulfide, carbon disulfide, carbon selenide sulfide, ammonium sulfide, sulfur oxides such as sulfur dioxide and sulfur trioxide, thiocarbonates, sulfuric acid and salts thereof, hydrogen sulfate, sulfite, hyposulfite, persulfate, thiocyanate, thiosulfate, halides such as sulfur dichloride, thionyl chloride and thiophosgene, boron sulfide, nitrogen sulfide, silicon sulfide, phosphorous sulfide, arsenic sulfide, metal sulfide and metal hydrosulfide. Among them, preferable compounds include sulfur, carbon disulfide, phosphorous sulfide, selenium sulfide, metal sulfide and metal hydrosulfide. More preferable compounds include sulfur, carbon disulfide and selenium sulfide. Particularly preferable compounds include sulfur.

The inorganic compounds having selenium atom(s) include all the inorganic compounds satisfying this requirement other than the above carbon selenide sulfide and selenium sulfide mentioned as the examples of the inorganic compounds having sulfur atom(s). Examples thereof include selenium, hydrogen selenide, selenium dioxide, carbon diselenide, ammonium selenide and selenium oxides such as selenium dioxide, selenic acid and salts thereof, selenious acid and salts thereof, hydrogen selenate, selenosulfuric acid and salts thereof, selenopyrosulfuric acid and salts thereof, halides such as selenium tetrabromide and selenium oxychloride, selenocyanate, boron selenide, phosphorus selenide, arsenic selenide and metal selenides. Preferable examples among them include selenium, carbon diselenide, phosphorus selenide and metal selenides. Particularly preferable examples among them include selenium and carbon diselenide.

These inorganic compounds inorganic compound having sulfur atom(s) and/or selenium atom(s) can be used each independently, or two or more of them can be used by mixture.

(2) Compound (b)

Examples of the compound (b) to be used for the present invention include at least one of episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide.

Preferable examples among them include bis(β-epithiopropyl)sulfide represented by the following formula (1) and/or bis(β-epithiopropyl)disulfide represented by the following formula (2). The most preferable example thereof is bis(β-epithiopropyl)sulfide.

[Chemical Formula 1]

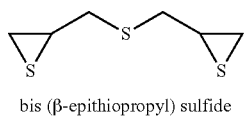

bis (β-epithiopropyl) sulfide (1)

[Chemical Formula 2]

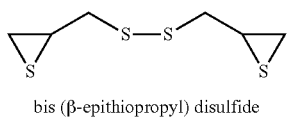

bis (β-epithiopropyl) disulfide (2)

The content of the compound (b) to be used for the present invention is 50-99 parts by weight, preferably 50-95 parts by weight, more preferably 60-90 parts by weight, particularly preferably 70-90 parts by weight based upon 100 parts by weight of the total weight of the compounds (a) and (b).

(3) Compound (c)

The compound (c) to be used for the present invention is a xylylenedithiol compound, and preferable examples thereof include o-xylylenedithiol, m-xylylenedithiol and p-xylylenedithiol. Preferable examples of the xylylenedithiol compounds among them include m-xylylenedithiol represented by the following formula (3) and p-xylylenedithiol represented by the following formula (4). Particularly preferable examples of the xylylenedithiol compounds include m-xylylenedithiol which is liquid at the room temperature.

[Chemical Formula 3]

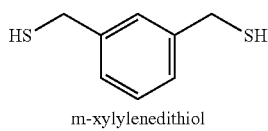

m-xylylenedithiol (3)

[Chemical Formula 4]

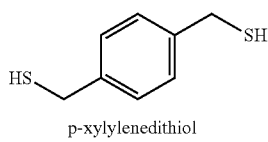

p-xylylenedithiol (4)

The content of the compound (c) to be used for the present invention is preferably 1-50 parts by weight, more preferably 2-30 parts by weight, even more preferably 3-10 parts by weight based upon 100 parts by weight of the total weight of the compounds (a) and (b).

(4) Polymerization Catalyst

Polymerization catalysts for polymerizing and curing can be added to the composition for use in an optical material of the present invention depending on its needs. Examples of the polymerization catalysts include amines, phosphines, quaternary ammonium salts, quaternary phosphonium salts, condensation compounds of aldehyde and amine compounds, salts of carboxylic acids and ammonia, urethanes, thiourethanes, guanidines, thioureas, thiazoles, sulfenamides, thiurams, dithiocarbamates, xanthates, tertiary sulfonium salts, secondary iodonium salts, mineral acids, Lewis acids, organic acids, silicic acids, tetrafluoroboric acids, peroxide, azo compounds and acidic phosphoesters.

The polymerization catalysts should not particularly be limited as long as exhibiting polymerizing and curing effects. In addition, the polymerization catalysts can be used each independently, or two or more of them can be used by mixture. Preferable examples thereof include quaternary ammonium salts such as tetra-n-butylammonium bromide, triethylbenzylammonium chloride, cetyl dimethylbenzylammonium chloride and 1-n-dodecylpyridinium chloride, and quaternary phosphonium salts such as tetra-n-butylphosphonium bromide and tetraphenylphosphonium bromide. More preferable examples thereof include triethylbenzylammonium chloride and/or tetra-n-butylphosphonium bromide. The most preferable example thereof is triethylbenzylammonium chloride.

The additive amount of the polymerization catalyst is 0.001-5 parts by weight, preferably 0.002-5 parts by weight, more preferably 0.005-3 parts by weight based upon 100 parts by weight of the total weight of the compounds (a), (b) and (c).

(5) Polymerization Regulator

Polymerization regulators can be added to the composition for use in an optical material of the present invention depending on its needs, for the purpose of elongation of the pot life and/or dispersion of the heat of polymerization. Examples of the polymerization regulators include halides of elements of 13th-16th groups in the long-form periodic table.

These polymerization regulators can be used each independently, or two or more of them can be used by mixture. Preferable examples among them include halides of silicon, germanium, tin and antimony. More preferable examples thereof include chlorides of silicon, germanium, tin and antimony. More preferable examples thereof include chlorides of silicon, germanium, tin and antimony having alkyl group(s). Most preferable examples thereof include dibutyltin dichloride, butyltin trichloride, dioctyltin dichloride, octyltin trichloride, dibutylgermanium dichloride, butylgermanium trichloride, diphenylgermanium dichloride, phenylgermanium trichloride and triphenylantimony dichloride.

The additive amount of the polymerization regulator is 0.001-5 parts by weight, preferably 0.002-5 parts by weight, more preferably 0.005-3 parts by weight based upon 100 parts by weight of the total weight of the compounds (a), (b) and (c).

(6) Performance Improver

Performance improvers which are compounds capable of reacting with some or all of the compositional components can be added to the composition for use in an optical material of the present invention, for the purpose of improving various performances such as oxidation resistance, weather resistance, dyeing affinity, strength and a refraction index. In this case, well-known polymerization catalysts can be added additionally, if necessary for reaction.

Examples of the compounds capable of reacting with some or all of the compositional components (performance improvers) include compounds having at least two —SH groups other than the xylylenedithiol compounds of the present invention, epoxy compounds, carboxylic acids, carboxylic acid anhydrides, phenols, amines, vinyl compounds, allylic compounds, acrylic compounds and methacrylic compounds.

The additive amount of the performance improvers is 0.001-10 parts by weight, preferably 0.002-5 parts by weight, more preferably 0.005-3 parts by weight respectively, based upon 100 parts by weight of the total weight of the compounds (a), (b) and (c).

(7) Other Optional Ingredients

As a matter of course, it is possible to add various known additives such as antioxidants, bluing agents, ultraviolet absorbing agents and odor eliminating agents as optional ingredients to the composition for use in an optical material of the present invention, if necessary, to improve practicality of the material thus obtained better.

When the optical material of the present invention is easy to remove from the mold during the polymerization, it is possible to use known improving agents for outer and/or inner adhesiveness. When the optical material of the present invention is hard to remove from the mold, it is possible to use known improving agents for outer and/or inner releasability.

These improvers for outer and/or inner adhesiveness and improvers for outer and/or inner releasability can be applied on a glass or metal mold to be used at the time of polymerizing and curing. Besides, it is also beneficial to add them to the composition for use in an optical material of the present invention to improve adhesiveness or releasability between the mold and the optical material thus obtained.

It is desirable for the composition for use in an optical material of the present invention that the content of the compound (a) is at least 10% by weight based upon the total amount of the composition for use in an optical material. When the content of the compound (a) based upon the total amount of the composition for use in an optical material is 10% by weight or more, a high refractive index wherein, in particular, ne is 1.73 or more can be achieved with ease.

In addition, it is desirable that a xylylene diisocyanate compound is not comprised in an amount of 1% by weight or more based upon the total amount of the composition for use in an optical material, that is, the content of a xylylene diisocyanate compound is less than 1% by weight based upon the total amount of the composition for use in an optical material. It is more desirable that said composition for use in an optical material does not comprise a xylylene diisocyanate compound. When the content of the xylylene diisocyanate compound is 1% by weight or more, a refractive index may be reduced significantly, which may cause not only difficulty of making the refractive index to be 1.73 or more, but also difficulty of obtaining a polymerization cured product because of taking place of rapid polymerization.

The compound (a) and the compound (b) can be comprised in said composition as a prepolymerization reactant obtained by prepolymerizing at least a part of the compounds with each other.

2. Process for Preparing Composition for Use in Optical Material

The composition for use in an optical material of the present invention can be obtained by mixing and stirring the above-mentioned compounds (a), (b) and (C) and optional ingredients used as needed by the usual methods. It is preferable to prepolymerize the compound (a) and at least a part of the compound (b) in advance, and subsequently to mix them with the compound (c).

(1) Prepolymerization Reaction

When preparing the composition for use in an optical material of the present invention, it is preferable to prepolymerize the compound (a) and at least a part of the compound (b) in advance, and subsequently to mix the prepolymerization reactant thus obtained with the compound (c) and optional ingredients. Carrying out the prepolymerization reaction between the compound (a) and the compound (b) is effective means for handling the compound (a) which is in the solid state, and transparency of the optical material thus obtained is good. In addition, it makes it possible to add a large amount of the compound (a) which is an inorganic compound having sulfur or the like to obtain a composition for use in an optical material capable of providing an optical material having a high refractive index, a high strength and high heat resistance.

The methods for carrying out the prepolymerization reaction between the compound (a) and the compound (b) will be described in detail below. Some or all of the compound (a) and the compound (b) respectively is reacted with each other with stirring or without stirring. Whereas the rate of the compounds to be subjected to prepolymerization reaction should not be particularly limited, it is preferable to carry out the prepolymerization reaction between the compound (a) and the compound (b) so that the compound (a) does not exist as a solid at the time of casting. It is more preferable that 50-100 parts by weight each of the compound (a) and the compound (b) is subjected to the prepolymerization reaction. It is particularly preferable that each full weight part of the compound (a) and the compound (b) is subjected to the prepolymerization reaction.

On this occasion, prepolymerization reaction catalysts capable of accelerating the reaction between the compound (a) and the compound (b) can be used. Whereas the above-mentioned polymerization catalysts can be used as the prepolymerization reaction catalysts, it is preferable to use a compound containing nitrogen atom(s) or phosphorus atom(s), and it is more preferable to use a compound containing nitrogen atom(s) or phosphorus atom(s) and having unsaturated bond(s). It is particularly preferable to use imidazoles, and it is most preferable to use 2-mercapto-1-methylimidazole. The additive amount of the prepolymerization reaction catalyst is 0.001-5 parts by weigh, preferably 0.002-5 parts by weight, more preferably 0.005-3 parts by weight based upon 100 parts by weight of the total weight of the compounds (a) and (b).

The prepolymerization reaction can be carried out under any atmosphere such as under the presence of gas such as air, nitrogen, oxygen or the like, under the sealed conditions at normal pressure, high pressure or reduced pressure, or under reduced pressure. Moreover, the prepolymerization reaction can be carried out in the presence of various optional additives such as polymerization regulators, performance improvers, ultraviolet absorbing agents and the like. In addition, it can be carried out in the presence of some or all of the compound (c). In this case, this prepolymerization reaction would result that a part of the polymerization curing reaction is carried out selectively in advance. Therefore, it is preferable to control the reaction by employing a mild condition or otherwise. It is particularly preferable that, after carrying out the prepolymerization reaction between the compound (a) and the compound (b), the compound (c) is added thereto.

The time for the prepolymerization reaction is from 1 minute to 72 hours, preferably from 10 minutes to 48 hours, more preferably from 30 minutes to 24 hours. The temperature of the prepolymerization reaction is 0° C.-150° C., preferably 10° C.-120° C., more preferably 20° C.-100° C.

Furthermore, it is preferable that 10 mol % or more of the compound (a) based upon 100 mol % of the compound (a) before reaction is subjected to reaction by this prepolymerization reaction. More preferably, 20 mol % or more of the same is subjected to reaction.

In addition, it is preferable to observe and control the progress of reaction by measuring liquid chromatography and/or viscosity and/or specific gravity and/or a refractive index regarding the prepolymerization reaction, in order to obtain a homogeneous composition for use in an optical material. It would also be possible to know the reaction rate of the compound (a).

Above all, measurements of liquid chromatography and/or a refractive index are preferable in terms of high sensitivity. Furthermore, a measurement of a refractive index is more preferable in terms of simplicity. When measuring a refractive index, it is preferable to employ an inline type refractometer, since the progress of reaction can be observed in real time.

(2) Mixture

The process for preparing the composition for use in an optical material is described in detail as follows:

The compound (a) and the compound (b) and/or a prepolymerization reaction product obtained by carrying out pre-polymerization reaction between the compound (a) and the compound (b)), the compound (c) and various additives such as performance improvers which are compounds capable of reacting with some or all of the compositional components, polymerization catalysts, polymerization regulators, adhesion improving agents or release property improving agents, antioxidants, bluing agents, ultraviolet absorbing agents and odor eliminators, can be mixed all together in a same container at once under stirring, or can be mixed by adding each starting material step-by-step, or can be mixed by mixing several components separately first and then further mixing them in a same container. Each of the starting materials and additives can be mixed in any order. Furthermore, mixing can be carried out after preliminary reaction among two or more of the above components in advance, besides the prepolymerization reaction of the combination of the compound (a) and the compound (b). For example, it is possible to carry out the above-mentioned prepolymerization reaction between the compound (a) and the compound (b), and separately, to carry out preliminary reaction, not merely mixing, between some of the compound (c) and a performance improver, and then to mix them.

Regarding the conditions for mixture such as the set temperature and time required, the conditions wherein each component can be mixed sufficiently can be employed basically. The excess of temperature and/or time is not appropriate for the reasons that it might cause undesirable reaction among the starting materials and additives with ease, and it might further cause an increase of viscosity to make casting operation difficult, and the like.

The mixing is carried out in the temperature range of from −50° C. to 100° C., preferably in the temperature range of from to 70° C., more preferably in the temperature range of from −5° C. to 50° C. The mixing time is in the range of from 1 minute to 12 hours, preferably in the range of from 5 minutes to 10 hours, most preferably in the range of from 5 minutes to 6 hours. The mixing can be carried out by shielding an active energy ray if necessary. And after that, a degassing treatment can also be carried out by the methods described below.

(3) Degassing Treatment

According to the process of preparing the composition for use in an optical material of the present invention, a degassing treatment can be carried out after preparing a resin composition by the above-mentioned mixing process. Performing a degassing treatment in advance before polymerizing and curing the composition for use in an optical material is preferable from the aspect of achieving high transparency of the optical material obtained by polymerization and curing.

The degassing treatment can be performed before mixing, during mixing, or after mixing the compound (a), the compound (b), the compound (c) and various additives such as compounds capable of reacting with some or all of the compositional components, polymerization catalysts, polymerization regulators and the like, under reduced pressure. Preferably, it is carried out during mixing or after mixing them under reduced pressure.

Regarding the conditions for degassing treatment, it can be carried out under reduced pressure of 0.1-15000 Pa in the temperature range of 0° C.-100° C. for 1 minute to 24 hours. The degree of vacuum is preferably 1-10000 Pa, more preferably 1-5000 Pa. The degree of vacuum can be varied within this range. The degassing time is 5 minutes to 18 hours, more preferably 10 minutes to 12 hours. The temperature at the time of degassing is preferably 5° C.-80° C., more preferably 10° C.-60° C. The temperature can be varied within this range.

At the time of degassing treatment, it is a desirable operation for enhancing the degassing effect to renew the interfacial surface of the composition for use in an optical material by stirring, blowing of air, vibrating by ultrasonic wave or the like.

Substances to be removed by degassing treatment, which mainly are dissolved gas such as hydrogen sulfide and low-boiling substances such as mercaptan having a low molecular weight, are not particularly limited as long as the effect of degassing treatment is exhibited.

The composition for use in an optical material thus obtained can be purified by filtrating to remove impurities or the like by a filter or the like immediately before polymerizing and curing. For raising the quality of the composition for use in an optical material of the present invention, it is desirable to purify the composition for use in an optical material by filtrating it through a filter to remove impurities or the like. The pore diameter of the filter to be used here is around 0.05-10 μm. Filters of 0.1-1.0 μm are commonly used. PTFE, PET, PP or the like are suitably used for materials of filters.

3. Optical Material

The optical material of the present invention is obtained by polymerizing and curing the above-mentioned composition for use in an optical material. The polymerizing and curing is carried out, in general, by heating using an electric furnace or by irradiating active energy lines such as ultraviolet light using an active energy ray generator or the like, after casting the composition for use in an optical material into a glass or metal mold. The polymerization time is 0.1-100 hours, commonly 1-48 hours. The polymerization temperature is −10° C. to 160° C., commonly −10° C. to 140° C. Polymerization can be carried out by holding at the intended polymerization temperature for the intended time, by increasing the temperature at the rate of 0.1° C.-100° C./h, by decreasing the temperature at the rate of 0.1° C.-100° C./h, or by the combination thereof.

After the completion of polymerization, it is a preferable treatment for removing strains of the optical material to be subjected to an annealing treatment at the temperature of 50° C. to 150° C. for 5 minutes to 5 hours. Furthermore, surface treatments such as dyeing, hard-coating, bluing, treatments for providing antifogging properties, antifouling properties, impact resistance or the like can be applied.

Polymerizing and curing the composition for use in an optical material which is a preferable embodiments of the present invention makes it possible to provide an optical material having a sufficiently high refractive index and the good Abbe's number, and further having a high strength and heat resistance That is, a composition for use in an optical material capable of providing an optical material wherein the intended refractive index (ne) of the resin is preferably 1.73 or more, more preferably 1.74 or more, regarding the strength, an elongation in a three-point bending test is 10% or more, more preferably 11% or more, most preferably 12% or more and drilling resistance is good, and regarding heat resistance, a softening point measured by TMA is 70° C. or higher, more preferably 72° C. or higher, most preferably 75° C. or higher, said optical material, and a lens for two-point frame spectacles can be provided.

According to a preferable embodiment of the present invention, a homogeneous composition for use in an optical material wherein sulfur which is a refractive index-improving agent is contained in large quantity, for example, in the amount of 10% by weight or more based upon the total amount of the composition for use in an optical material can be obtained. And by using the same, an optical material having a high refractive index which is 1.73 or more can be obtained.

According to the conventional compositions and methods for preparation, a cured product (or an optical material) having a refractive index of 1.73 or more could not be obtained because of rapid polymerization occurred by adding sulfur or the like in large quantity. Compatibility of sulfur, which is the compound (a) in the present invention, with other compositional components is not sufficient, and thus, when adding the compound (a) in large quantity, the compound (a) might be remained in the cured product as a solid without dissolving completely, which might cause not only deterioration of a refractive index, but also difficulty in obtaining a transparent optical material.

According to the present invention, by subjecting the compound (a) to prepolymerization reaction in advance to consume appropriate quantities thereof at the stage of preparing the composition for use in an optical material, it will be possible to dissolve the compound (a) completely to be a homogeneous liquid composition, and as a result, an optical material having a high refractive index will be obtained. Isocyanate compounds used to be added conventionally for achieving high strength, but in the case of adding the compound (a) in large quantity, rapid polymerization would tend to take place by adding isocyanate compounds at the same time, which would make it difficult to obtain polymerization cured products. According to the preferable embodiment of the present invention, on the other hand, in order to avoid rapid polymerization, the content of isocyanate compounds is limited to a low quantity, or preferably, substantially no isocyanate compound is used, and in addition, a xylylenedithiol compound is used as a compound (c).

As mentioned above, by employing the distinguishing composition and method for preparing of the present invention, a high refractive index (ne is 1.73 or more) can be achieved, and an optical material having a high strength (an elongation is 10% or more in a three-point bending test and drilling resistance is good), and high heat resistance can be obtained with ease.

EXAMPLES

The present invention will be described in more detail below, referring to examples, which are not intended to limit the scope of the present invention.

Evaluation of the refractive index, the Abbe's number, heat resistance, an elongation and drilling resistance of the optical materials obtained were carried out by the following methods:

[Measurements of Refractive Index (ne) and Abbe's Number]

The refractive index (ne) and the Abbe's number were measured by a digital precision refractometer manufactured by Kalnew Optical Industrial Co., Ltd., trade name "KPR-200", at 25° C.

[Measurement of Heat Resistance]

A sample piece was cut out to be 3 mm thick, and TMA measurement, manufactured by Seiko Instruments Inc., trade name "TMA/SS6100", was carried out by applying a load of 10 g to a pin of 1 mm$\phi$ and by increasing the temperature from 30° C. at the rate of 10° C./min to measure a softening point.

[Measurement of Elongation (Strength)]

With reference to JIS K-7171, a flat plate having the thickness of 2.5 mm and the width of 10.0 mm was subjected to a three-point bending test using "Autograph", manufactured by Shimadzu Corporation, trade name "AG-5000B", at the distance between the supporting points of 40 mm to measure an elongation at rupture.

[Drilling Resistance]

With reference to the evaluation method described in the above-mentioned Patent Document 4 (Jpn. Pat. Laid-Open Publication No. 2008-101190), a hole having the diameter of 2 mm was bored on a flat plate of 2.5 mm thick, by drilling with the number of rotation of 2500 rpm and an intruding speed of 600 mm/min, and the surrounding part of the hole was observed. The evaluation for the hole wherein no crack was observed in the surrounding part was "○" and for the hole wherein cracks were observed was "X".

Example 1

1 part by weight of 2-(2-hydroxy-5-tert-octylphenyl)benzotriazole was added to 100 parts by weight of the total weight of 16 parts by weight of sulfur as the compound (a) and 84 parts by weight of bis($\beta$-epithiopropyl)sulfide as the compound (b), and they were mixed up at 60° C. to make it uniform. Subsequently, 0.5 parts by weight of 2-mercapto-1-methylimidazole was added thereto and prepolymerization reaction was carried out at 60° C. until the compound (a) was did not precipitate any more at 20° C.

In this example, prepolymerization reaction was terminated at the stage wherein approximately 50 mol % of the compound (a) was subjected to reaction. Therefore, the compound (a) was remained in the composition thus obtained. The rate of reaction of the compound (a) was determined by subjecting the reaction mixture to liquid chromatography analyses and by measuring a refractive index thereof.

Thereafter, the composition thus obtained was cooled down to 20° C. 7 parts by weight of m-xylylenedithiol as the compound (c) (hereinafter, "compound c-1"), 0.035 parts by weight of triethylbenzylammonium chloride as a polymerization catalyst, 0.22 parts by weight of di-n-butyltin dichloride as a polymerization regulator were added thereto to mix up to make a uniform composition, and then degassing treatment was carried out under the conditions of 4000 Pa for 20 minutes at 20° C.

The composition for use in an optical material thus obtained was subjected to filtration by a membrane filter made of PTFE with 1.0 μm, and then was cast to a flat plate mold with the thickness of 2.5 mm composed of two glass plates and a gasket to heat at 30° C. for 10 hours. Thereafter, the temperature was elevated from 30° C. to 100° C. taking 10 hours at a constant rate, and in the last stage, polymerizing and curing was carried out by heating at 100° C. for 1 hour. After being cooled in the air to reach a room temperature, a cured optical material was obtained by releasing from the mold. The refractive index, the Abbe's number, heat resistance, an elongation and drilling resistance of the optical material thus obtained were evaluated and the results thereof were shown in Table 1.

Example 2

16 parts by weight of the compound (a), 84 parts by weight of the compound (b), 1 part by weight of the compound c-1 as the compound (c) and 1 part by weight of 2-(2-hydroxy-5-tert-octylphenyl)benzotriazole as an ultraviolet absorbent were added and were mixed up at 50° C. to make it uniform. Subsequently, 0.05 parts by weight of 2-mercapto-1-methylimidazole was added thereto and prepolymerization reaction was carried out at 50° C. until the compound (a) did not precipitate any more at 20° C.

In this example, prepolymerization reaction was terminated at the stage wherein approximately 50 mol % of the compound (a) was subjected to reaction. Therefore, the compound (a) was remained in the composition thus obtained.

Thereafter, the composition thus obtained was cooled down to 20° C. 7 parts by weight of the compound c-1 which had not been added yet, 0.050 parts by weight of triethylbenzylammonium chloride as a polymerization catalyst, 0.22 parts by weight of di-n-butyltin dichloride as a polymerization regulator were added thereto, and treatments and polymerizing and curing were carried out in the same manner as Example 1 to obtain an optical material. The refractive index, the Abbe's number, heat resistance, an elongation and drilling resistance of the optical material thus obtained were evaluated and the results thereof were shown in Table 1.

Examples 3-6

Treatments and polymerizing and curing were carried out in the same manner as Example 1 except for changing the amount of the compound (c). The refractive index, the Abbe's number, heat resistance, an elongation and drilling resistance of the optical material thus obtained were evaluated and the results thereof were shown in Table 1.

Example 7

Treatments and polymerizing and curing were carried out in the same manner as Example 1 except for using p-xylylenedithiol (hereinafter, "the compound c-2") in place of the compound c-1 as the compound (c). The refractive index, the Abbe's number, heat resistance, an elongation and drilling resistance of the optical material thus obtained were evaluated and the results thereof were shown in Table 1.

Comparative Example 1

Treatments and polymerizing and curing were carried out in the same manner as Example 1 except for eliminating the compound c-1 from the composition. The refractive index, the Abbe's number, heat resistance, an elongation and drilling resistance of the optical material thus obtained were evaluated and the results thereof were shown in Table 1. Elongation and drilling resistance of the optical material thus obtained were insufficient.

Comparative Example 2

Treatments and polymerizing and curing were carried out in the same manner as Example 1 except for using bis(2-mercaptoethyl)sulfide (hereinafter, "the compound o-1") in place of the compound c-1 as the compound (c). However, degassing treatment was carried out under the conditions of 4000 Pa for 90 minutes at 20° C., in order to maintain the refractive index and heat resistance. The refractive index, the Abbe's number, heat resistance, an elongation and drilling resistance of the optical material thus obtained were evaluated and the results thereof were shown in Table 1. Elongation and drilling resistance of the optical material thus obtained were insufficient.

Comparative Example 3

Treatments and polymerizing and curing were carried out in the same manner as Comparative Example 2 except for changing the amount of the compound o-1. The refractive index, the Abbe's number, heat resistance, an elongation and drilling resistance of the optical material thus obtained were evaluated and the results thereof were shown in Table 1. Elongation and drilling resistance of the optical material thus obtained were insufficient.

Comparative Example 4

100 parts by weight of the compound (b), 16 parts by weight of the compound c-1, 0.005 parts by weight of sodium polyoxyethylene lauryl ether phosphate as an inner mold release agent and 0.05 parts by weight of di-n-butyltin dichloride as a polymerization regulator were mixed to form a uniform composition. Degassing treatment was carried out under reduced pressure of 1300 Pa for 30 minutes, and then polymerizing and curing was carried out in the same manner as Example 1. The refractive index, the Abbe's number, heat resistance, an elongation and drilling resistance of the optical material thus obtained were evaluated and the results thereof were shown in Table 1. The refractive index and heat resistance of the optical material thus obtained were insufficient.

Comparative Examples 5-7

Experiments were repeated in the same manner as Comparative Example 4 except for changing the compositions as shown in Table 1. The refractive index, the Abbe's number, heat resistance, an elongation and drilling resistance of the optical material thus obtained were evaluated and the results thereof were shown in Table 1. The refractive index of each optical material thus obtained was insufficient. Heat resistance and drilling resistance of each optical material thus obtained were insufficient.

Comparative Example 8

16 parts by weight of the compound (a) and 84 parts by weight of the compound (b) were subjected to prepolymerization process in the same manner as Example 1 to obtain a uniform composition. 15 parts by weight of the compound o-1, 12 parts by weight of the compound o-2, 0.035 parts by weight of triethylbenzylammonium chloride as a polymerization catalyst and 0.22 parts by weight of di-n-butyltin dichloride as a polymerization regulator were added thereto to mix up to make it uniform. However, rapid polymerization occurred and a cured optical material was not obtained.

TABLE 1

| | Composition: parts by weight | | | | | Optical Performance | | Heat Resistance | Strength | |
|---|---|---|---|---|---|---|---|---|---|---|
| | Cpd. (a) | Cpd. (b) | Cpd. (c) | Other Cpds. (o) | | ne | vd | (° C.) | Elongation (%) | drill |
| Example 1 | 16 | 84 | c-1: 7 | | | 1.74 | 32 | 72 | 12 | ○ |
| Example 2 | 16 | 84 | c-1: 8 | | | 1.74 | 32 | 70 | 12 | ○ |
| Example 3 | 16 | 84 | c-1: 6 | | | 1.74 | 32 | 73 | 11 | ○ |
| Example 4 | 16 | 84 | c-1: 5 | | | 1.74 | 32 | 75 | 11 | ○ |
| Example 5 | 13 | 87 | c-1: 7 | | | 1.73 | 32 | 73 | 11 | ○ |
| Example 6 | 20 | 80 | c-1: 10 | | | 1.74 | 32 | 70 | 11 | ○ |
| Example 7 | 16 | 84 | c-2: 7 | | | 1.74 | 32 | 73 | 11 | ○ |
| Comp. Ex. 1 | 16 | 84 | | | | 1.74 | 33 | 85 | 6 | X |
| Comp. Ex. 2 | 16 | 84 | | o-1: 7 | | 1.73 | 32 | 71 | 7 | X |
| Comp. Ex. 3 | 16 | 84 | | o-1: 10 | | 1.73 | 32 | 67 | 9 | X |
| Comp. Ex. 4 | | 100 | c-1: 16 | | | 1.71 | 34 | 68 | 10 | ○ |
| Comp. Ex. 5 | | 100 | c-1: 16 | | o-2: 12 | 1.70 | 34 | 73 | 11 | ○ |
| Comp. Ex. 6 | | 100 | | o-1: 15 | o-2: 12 | 1.70 | 34 | 69 | 10 | X |
| Comp. Ex. 7 | 4 | 96 | | o-1: 15 | o-2: 12 | 1.71 | 33 | 71 | 10 | X |
| Comp. Ex. 8 | 16 | 84 | | o-1: 15 | o-2: 12 | Rapid Polymerization occurred and could not obtain a cured product. | | | | |

Symbols in the above Table 1 represent as follows:
(a) Sulfur
(b) bis(β-epithiopropyl)sulfide
(c-1) m-xylylenedithiol
(c-2) p-xylylenedithiol
(o-1) bis(2-mercaptoethyl)sulfide
(o-2) 1,3-bis(1-isocyanate-1-methylethyl)benzene

INDUSTRIAL APPLICABILITY

The composition for use in an optical material makes it possible to provide an optical material having excellent performances such as a high refractive index, a high strength and high heat resistance by polymerizing and curing. The optical material of the present invention like this is suitable for optical materials such as a plastic lens, a prism, an optical fiber, an information recording base material and the like. Among them, the optical material is suitably used for a plastic lens, in particular, a lens for two-point frame spectacles.

The invention claimed is:

1. A composition for use in an optical material comprising:
   (a) 1-50 parts by weight of an inorganic compound having sulfur atom(s) and/or selenium atom(s);
   (b) 50-99 parts by weight of at least one of episulfide compounds selected from the group consisting of bis(β-epithiopropyl)sulfide, bis(β-epithiopropyl)disulfide, bis (β-epithiopropyl)trisulfide, bis(β-epithiopropylthio) methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide,
   the sum of (a) and (b) being 100 parts by weight; and
   (c) 1-50 parts by weight of a xylylenedithiol compound based upon the sum of (a) and (b), which is 100 parts by weight,
   wherein 50-100% by weight of each of said inorganic compound (a) and said episulfide compound (b) are contained as a prepolymerization reactant of the inorganic compound (a) and the episulfide compound (b), and
   said composition for use in an optical material does not comprise a xylylene diisocyanate compound.

2. The composition for use in an optical material according to claim 1, wherein said inorganic compound (a) is sulfur.

3. The composition for use in an optical material according to claim 1, wherein said episulfide compound (b) is bis(β-epithiopropyl)sulfide and/or bis(β-epithiopropyl)disulfide.

4. The composition for use in an optical material according to claim 1, wherein said xylylenedithiol compound (c) is m-xylylenedithiol and/or p-xylylenedithiol.

5. The composition for use in an optical material according to claim 1, wherein the content of said inorganic compound (a) is 10% by weight or more based upon the total content of said composition for use in an optical material.

6. A process for preparing a composition for use in an optical material as recited in claim 1, which comprises mixing components (a), (b) and (c).

7. A process for producing an optical material, which comprises the following:
   preparing a composition for use in an optical material as recited in claim 1 by mixing components (a), (b) and (c) and
   polymerizing and curing said composition for use in an optical material.

8. An optical material obtained by a process for producing according to claim 7, which has a refractive index (ne) of 1.73 or more.

9. A lens for two-point frame spectacles composed of the optical material according to claim 8.

* * * * *